(12) United States Patent
Carnevali

(10) Patent No.: US 8,622,359 B2
(45) Date of Patent: Jan. 7, 2014

(54) MOUNTING FOR A PORTABLE DEVICE

(76) Inventor: Jeffrey D. Carnevali, Seattle, WA (US)

( * ) Notice: Subject to any disclaimer, the term of this patent is extended or adjusted under 35 U.S.C. 154(b) by 0 days.

(21) Appl. No.: 13/541,735

(22) Filed: Jul. 4, 2012

(65) Prior Publication Data

US 2012/0318937 A1    Dec. 20, 2012

Related U.S. Application Data

(63) Continuation-in-part of application No. 13/161,148, filed on Jun. 15, 2011.

(51) Int. Cl.
*A47G 1/10*    (2006.01)

(52) U.S. Cl.
USPC ........................................ 248/316.1; 379/455

(58) Field of Classification Search
USPC .................... 29/450; 248/122.1, 172, 346.06, 248/346.07, 316.1; 379/455
See application file for complete search history.

(56) References Cited

U.S. PATENT DOCUMENTS

| | | | | |
|---|---|---|---|---|
| 4,541,597 A * | 9/1985 | Davanture | ..................... | 248/167 |
| 5,615,258 A * | 3/1997 | Ho | ................................ | 379/446 |
| 6,966,533 B1 * | 11/2005 | Kalis et al. | .................. | 248/316.4 |
| 7,080,812 B2 * | 7/2006 | Wadsworth et al. | ........ | 248/316.6 |
| 7,647,676 B2 * | 1/2010 | Carnevali | ......................... | 24/523 |
| 8,176,603 B2 * | 5/2012 | Carnevali | ......................... | 24/523 |
| 2006/0261227 A1 * | 11/2006 | Petrick et al. | .............. | 248/276.1 |
| 2008/0203260 A1 * | 8/2008 | Carnevali | .................... | 248/316.5 |
| 2010/0237210 A1 * | 9/2010 | Anderson et al. | ........... | 248/274.1 |

* cited by examiner

*Primary Examiner* — David Bryant
*Assistant Examiner* — Justin Sikorski
(74) *Attorney, Agent, or Firm* — Charles J. Rupnick

(57) ABSTRACT

A mounting apparatus for a portable device having a body with a base covered by a cover having an exterior interface surface, the base and cover substantially enclosing an interior space therebetween with two pivots in spaced apart positions between the base and cover. A pair of substantially rigid arms crossing in a substantially X-shaped pattern and spreadable about the interface surface of the cover are set within the body. Each of the arms has: a rotation portion pivotally coupled to one of the pivots, a pair of substantially upright clamping fingers adjacent to opposite distal end portions thereof and positioned externally of the interior space of the body and projected upwardly above the exterior interface surface of the cover portion thereof, and a handle projected therefrom. A biasing member is coupled between attachment points of the arms for biasing together opposing pairs of the clamping fingers.

19 Claims, 8 Drawing Sheets

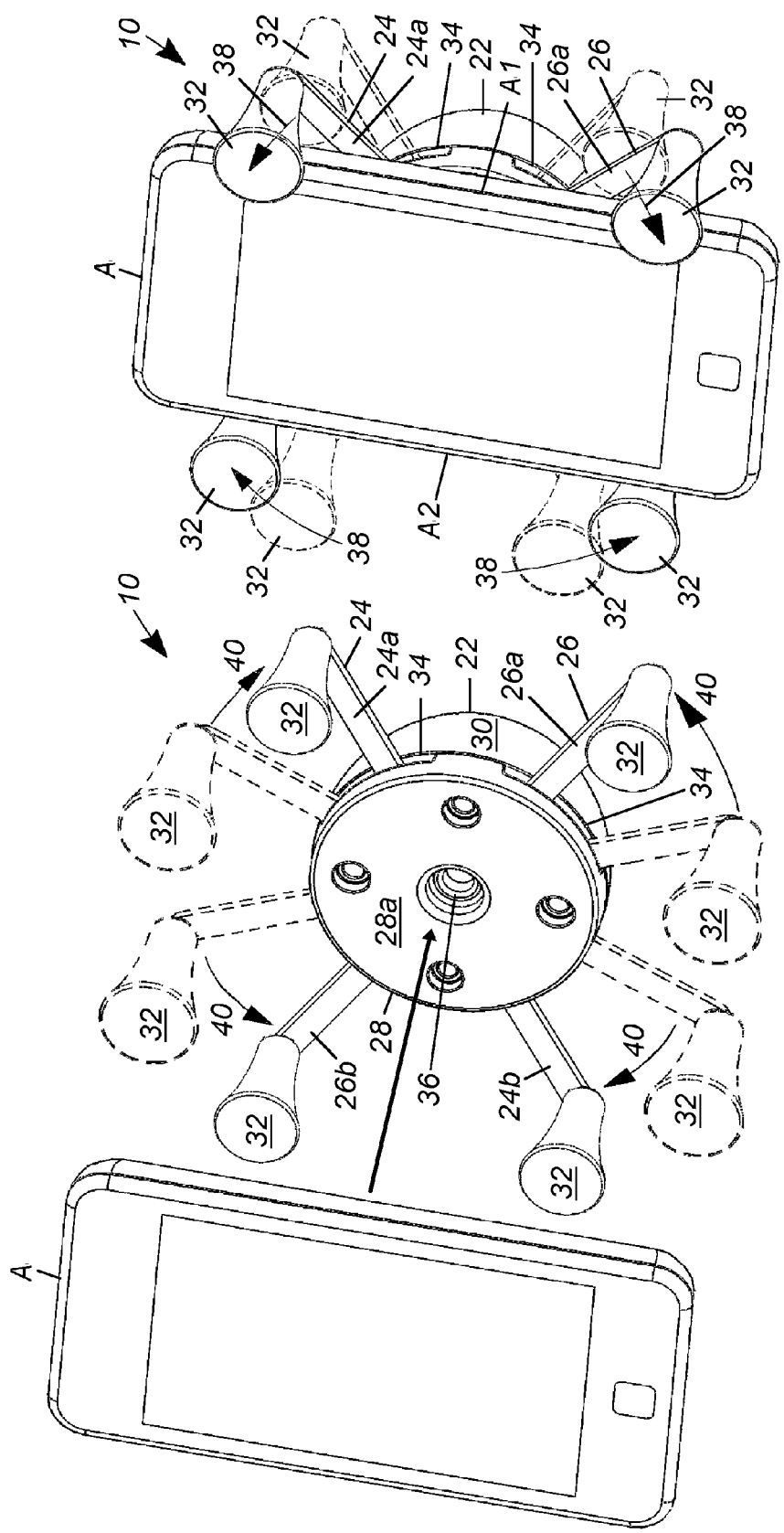

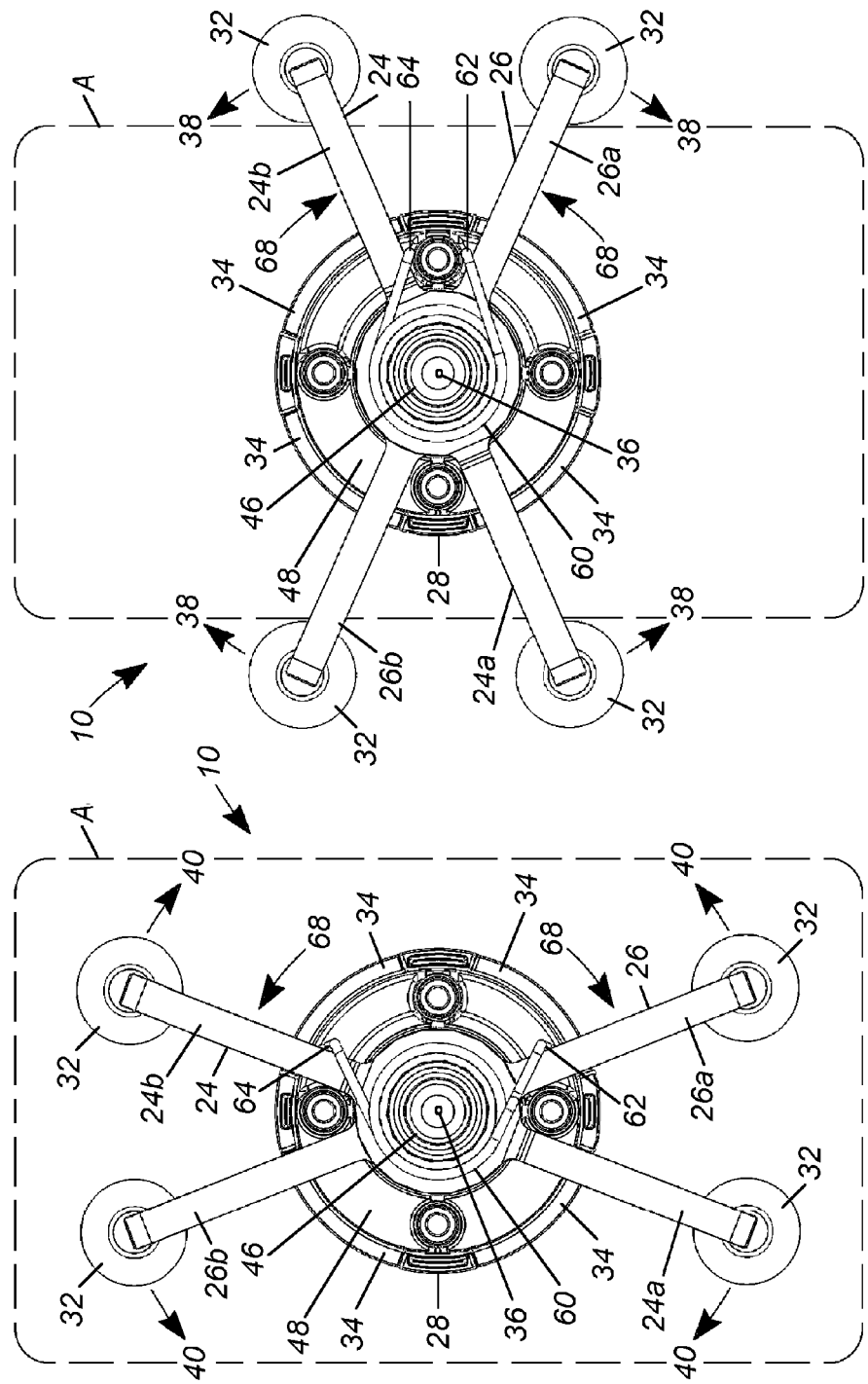

MOUNTING FOR A PORTABLE DEVICE

This application is a Continuation-In-Part and claims priority benefit of copending parent U.S. patent application Ser. No. 13/161,148 filed in the name of Jeffrey D. Carnevali, the common inventor hereof, on Jun. 15, 2011, the complete disclosure of which is incorporated herein by reference.

FIELD OF THE INVENTION

The present invention relates generally to clamping apparatus for mounting portable devices, and in particular to spring-driven quick release clamping apparatus for portable phones, ipads, and other hand-held portable electronics devices.

BACKGROUND OF THE INVENTION

Spring-driven clamps are known for mounting device holders to hold small cameras onto flat screen computer displays for the purpose of web conferencing, the clamp being coupled at the camera's base by a standard ¼ inch-20 threaded connection and operated to grip a suitable external mounting surface of the flat screen computer display. However, such known clamps are limited in their ability to provide a universal mounting solution because the external mounting surface for the clamp is limited to a projection surface, such as the flat screen computer display, that is narrow enough to receive the arms of the around it and rigid enough to stand up under the load. Also, the structure of the clamp for receiving the camera device is the standard ¼ inch-20 female thread common to virtually all cameras.

SUMMARY OF THE INVENTION

A spring-driven mounting apparatus for a portable device. According to one embodiment of the invention, the mounting apparatus includes: a body structured for mounting to a support stand, the body having a base portion substantially covered by a cover portion having a substantially planar exterior interface surface, the base and cover portions substantially enclosing an interior space therebetween with a plurality of peripheral slotted apertures formed therebetween, and further having two pivots in spaced apart positions between the base and cover portions and aligned substantially along one axis of the body. A pair of substantially rigid curvilinear arms is mounted on the two pivots and crossing in a substantially X-shaped pattern, the arms being extended outwardly of the interior space of the body through the peripheral slotted apertures thereof and being independently spreadable about the interface surface of the body cover portion. Each of the arms has an intermediate rotation portion pivotally coupled to one of the pivots, a pair of substantially upright clamping fingers adjacent to opposite distal end portions thereof and positioned externally of the interior space of the body and projected upwardly above the exterior interface surface of the cover portion thereof, and a handle projected therefrom below the exterior interface surface of the cover portion of the body. A resilient biasing member is coupled between attachment points of the arms for resiliently biasing together opposing pairs of the clamping fingers.

According to one embodiment of the apparatus, the attachment points for the biasing member are further positioned between the one of the pivots and one of the clamping fingers on each arm.

According to another embodiment of the apparatus, the handles are further positioned between the attachment points for the biasing member and one of the clamping fingers on each arm.

According to another embodiment of the apparatus, the apparatus has two biasing members. A first one of the biasing members is further coupled between a first one of the pivots and a first one of the clamping fingers on each arm, and a second one of the biasing members is further coupled between a second one of the pivots and a second one of the clamping fingers on each arm.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 and FIG. 3 each illustrate portable device mounting apparatus of the invention having rotationally movable arm pairs for receiving the normally hand-held device, wherein FIG. 2 illustrates the mounting apparatus deployed in an initial relaxed or unexpanded state, and FIG. 3 illustrates the mounting apparatus deployed in a compressive state;

FIG. 5 and FIG. 6 show an interior of the mounting apparatus, wherein the cover is removed for clarity, wherein FIG. 5 shows the mounting apparatus without its torsional biasing element, and FIG. 6 shows the torsional biasing element;

FIG. 7 illustrates insertion of a portable device into the mounting apparatus;

FIG. 8 illustrates clamping of the portable device in the mounting apparatus;

FIG. 9 and FIG. 10 each illustrate operation of the mounting apparatus from underneath, wherein the body cover is removed for clarity; and FIGS. 11 and 12 illustrate a holding and mounting apparatus that is a variation of mounting apparatus shown in FIGS. 1-10, wherein FIG. 11 is a perspective view that illustrates the holding and mounting apparatus for use in conjunction with normally hand-held portable computing devices such as but not limited to tablet computers, and FIG. 12 shows an interior of the holding and mounting apparatus shown in FIG. 11.

DETAILED DESCRIPTION OF PREFERRED EMBODIMENT

Although the following discussion is directed toward use of the present invention in conjunction with hand-held portable telephones, those skilled in the art will recognize that the present invention may be utilized to securely mount a wide variety of similar articles at a convenient location. Thus, discussion of the present invention in conjunction with a hand-held portable telephone is by way of example only and not by way of limitation.

As required, a detailed illustrative embodiment of the present method of clamping a normally hand-held device is disclosed herein. However, techniques, systems and operating structures in accordance with the present method of clamping a normally hand-held device may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present method of clamping a normally hand-held device. The following presents a detailed description of an illustrative embodiment (as well as some alternative embodiments) of the present method of clamping a normally hand-held device.

In the Figures, like numerals indicate like elements.

Figure 1:
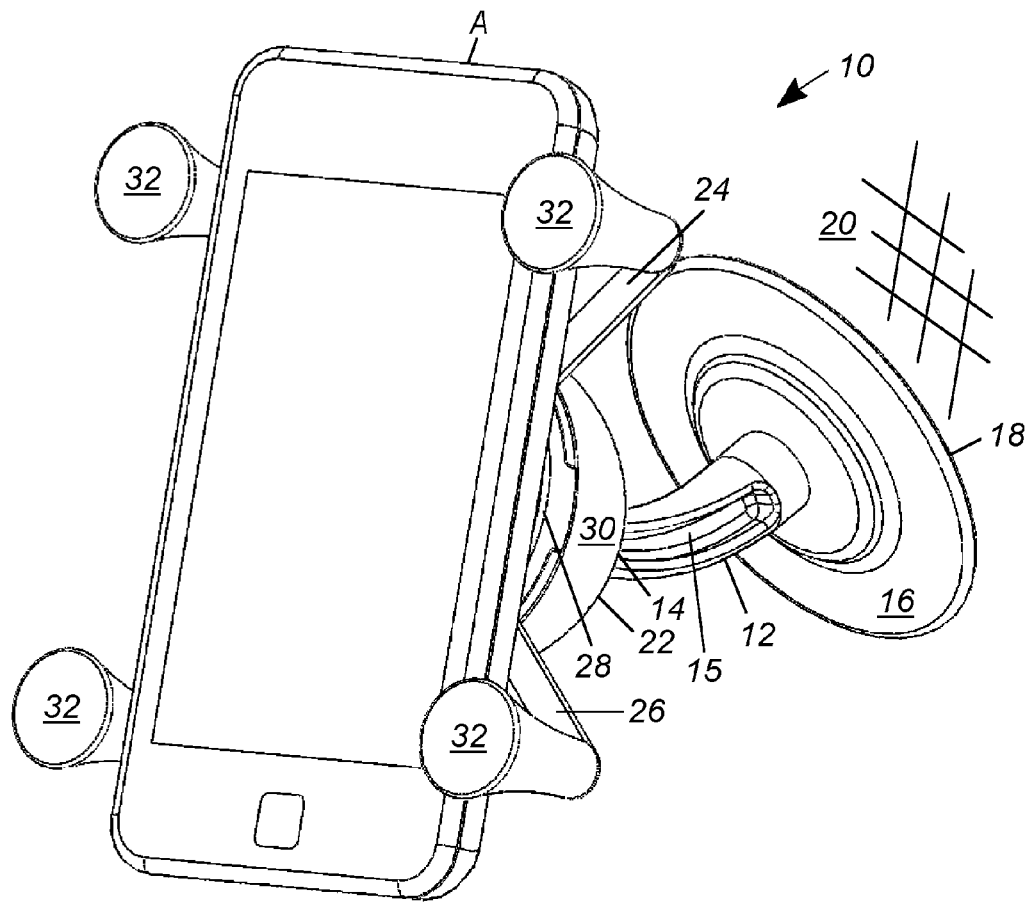
FIG. 1 illustrates an X-grip portable device mounting apparatus of the invention being coupled to as external mounting surface 20 by a support stand 12.

The method of the present invention of clamping a normally hand-held device is illustrated in FIGS. 1-10 of the drawings which depict a presently best mode embodiment of the method of the invention. Referring now to FIG. 1, an X-grip hand-held portable telephone mounting apparatus 10 is mounted on a support stand 12, such as but not limited to a mounting apparatus having one or more interconnectable articulated elements 14 of the type disclosed, for example, in U.S. patent application Ser. No. 12/589,744 filed in the name of the inventor of the instant invention on Oct. 28, 2009, the complete disclosure of which is incorporated herein by reference, and having a rigid arm 15 extended from a mounting base portion formed of a pliantly conformable mounting pad 16 with a coupling agent such as a conventional pressure sensitive adhesive, or PSA, on its under surface 18 for coupling to a mounting surface 20 external of mounting apparatus 10. Accordingly, mounting apparatus 10 is mounted on external mounting surface 20 by coupling support stand 12 therebetween. X-grip hand-held portable device mounting apparatus 10 is structured for releasably clamping a hand-held portable telephone or other normally hand-held device A. For example, mounting apparatus 10 includes a substantially hollow part-spherical or cup-shaped body 22 having at least two pair of rotationally movable substantially rigid opposing arms 24 and 26 extending substantially radially outwardly therefrom adjacent to a substantially planar interface surface 28a of a base portion 28 of body 22 cutting across its substantially hollow part-spherical or cup-shaped cover portion 30. Arm pairs 24, 26 are rotationally biased toward one another on substantially opposite sides of body 22 of mounting apparatus 10. Each arm 24, 26 includes a corresponding substantially upright clamping finger 32 distal from mounting apparatus body 22 and projected upwardly above interface surface 28a of base portion 28 of body 22. Clamping fingers 32 optionally include rubber or another resiliently compressible elastomeric material suitable for protecting the normally hand-held device A from scratching while providing a high friction surface suitable for resisting any tendency for the device A to slide from between clamping fingers 32.

A hand-held portable telephone or other normally hand-held device A is captured between clamping fingers 32 of pairs of arms 24, 26 for convenient storage and access thereto. X-grip mounting apparatus 10 is supported by support stand 12 which attaches mounting apparatus 10 to a desired mounting surface 20 of a vehicle, such as but not limited to an automobile, boat or airplane.

The universally adjustable mounting device is optionally a universally positionable mounting device such as that manufactured by National Products, Inc., of Seattle, Wash., and detailed in U.S. Pat. No. 5,845,885, the complete disclosure of which is hereby incorporated by reference, however other similar devices are contemplated herein. As will be recognized, such devices provide a means whereby the X-grip mounting apparatus 10 can be rapidly mounted to a wide variety of surfaces and once attached, the mounting apparatus 10 can be oriented as desired. Alternatively, no such mounting device may be utilized and the hand-held portable device mounting apparatus 10 of the present invention is mounted directly to a desired surface, i.e. an automobile dashboard or console.

Figure 2:
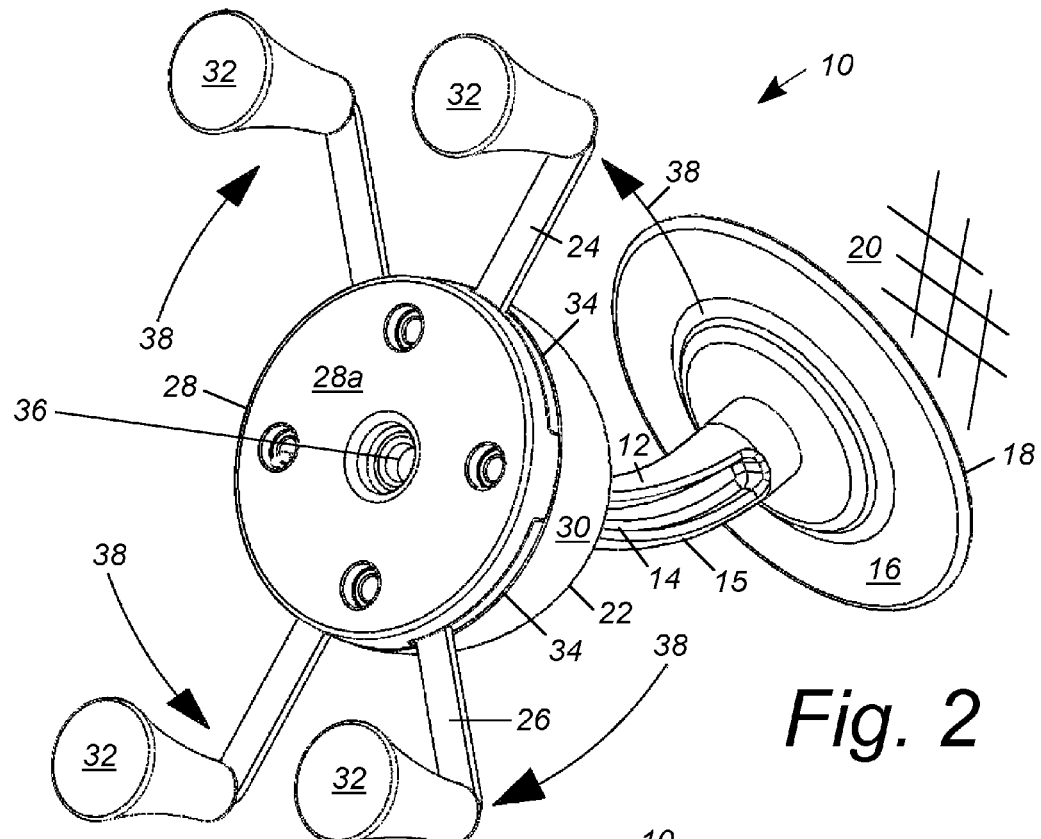
Figure 3:
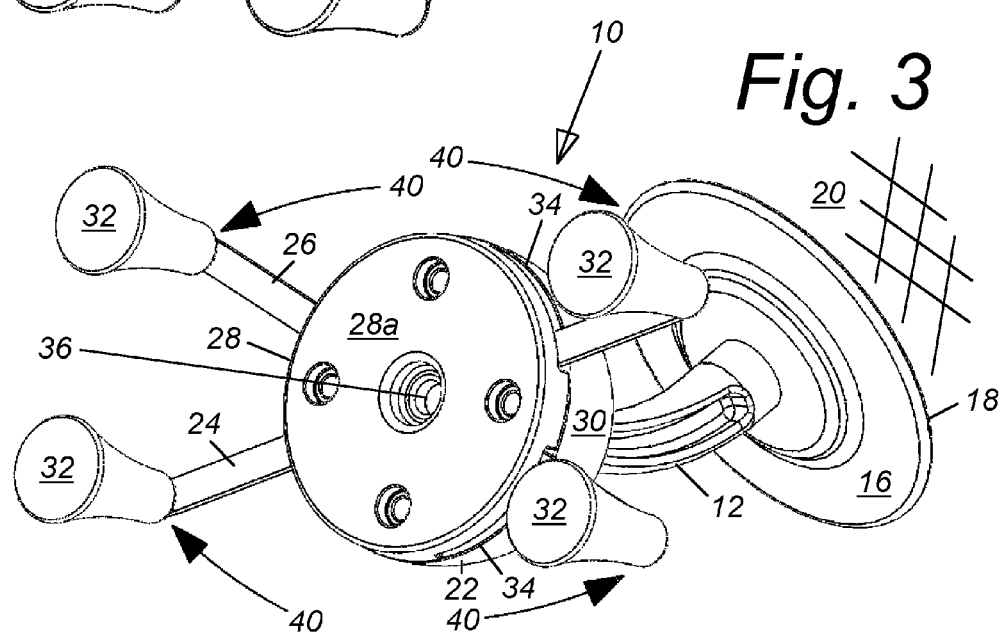

FIG. 2 and FIG. 3 each illustrate part-spherical or cup-shaped portion 30 of body 22 of mounting apparatus 10 being supported on support stand 12 with rotationally movable arm pairs 24, 26 extended substantially radially outwardly therefrom adjacent to substantially planar interface surface 28a of base portion 28 of body 22 opposite from support stand 12. Accordingly, mounting apparatus 10 is available for receiving the normally hand-held device A in a position substantially seated against interface surface 28a of base portion 28 between corresponding clamping fingers 32 of arm pairs 24, 26. Rotationally movable arm pairs 24, 26 are extended substantially radially from body 22 through circumferential slotted apertures 34 adjacent to its interface surface 28a for seating hand-held device A there against. Slotted apertures 34 extend part of circumference of body 22 and permit arm pairs 24, 26 to rotate about an axis 36 of body 22 that is substantially perpendicular to interface surface 28a of base portion 28. FIG. 2 illustrates mounting apparatus 10 deployed in an initial relaxed or unexpanded state with arm pairs 24, 26 being resiliently urged together (arrows 38) in rotation each toward the other, with upright clamping fingers 32 being brought together at opposite sides of base interface surface 28a of body 22, for example top and bottom of body 22 as illustrated here.

FIG. 3 illustrates mounting apparatus 10 deployed in a compressive state with arm pairs 24, 26 being forcibly rotated apart (arrows 40) against resilient urging force each away from the other, with upright clamping fingers 32 being spread apart at opposite sides of base interface surface 28a of body 22, for example left and right of body 22 as illustrated here.

Figure 4:
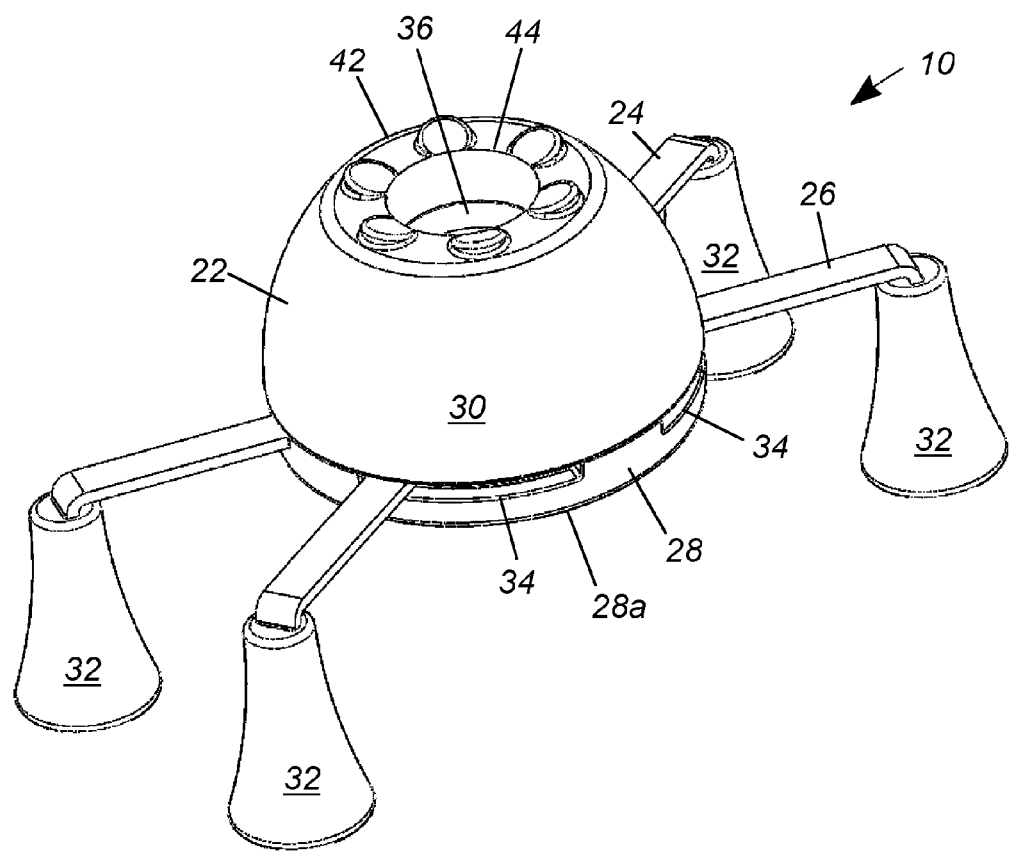
FIG. 4 illustrates a part-spherical cover portion of a body of the mounting apparatus.

FIG. 4 illustrates part-spherical or cup-shaped cover portion 30 of body 22 of mounting apparatus 10, wherein a crown portion 42 of cover 30 is adapted for mounting on support stand 12. For example, body 22 of mounting apparatus 10 is mounted on mounting surface 20 external of mounting apparatus 10 with interface surface 28a thereof facing substantially oppositely or away from external mounting surface 20. According to one exemplary embodiment, crown portion 42 of cover 30 is formed with a connector base 44. Here, connector base 44 is illustrated by example and without limitation in the form of a pocket adapted to interconnect with a ball portion on the end of rigid arm 15 of support stand 12 to form therewith an articulated ball-and-socket joint when support stand 12 is of the type disclosed, for example, in U.S. patent application Ser. No. 12/589,744, which is incorporated herein, however other similar devices are contemplated herein.

Figure 5:
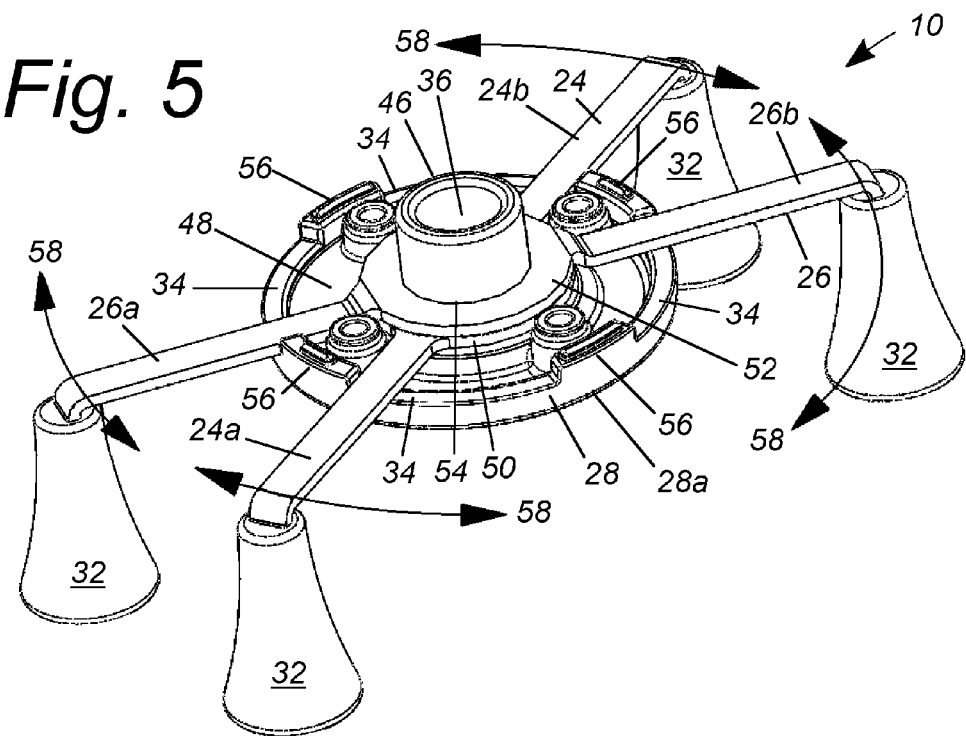
Figure 6:
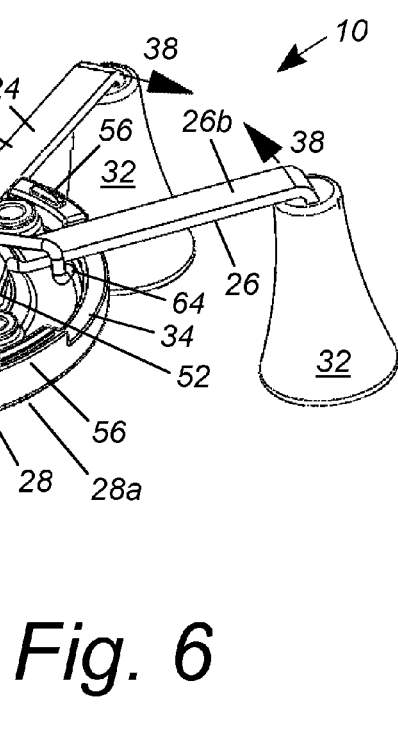

FIG. 5 and FIG. 6 show an interior of mounting apparatus 10, wherein cover 30 is removed for clarity. Within the interior of mounting apparatus 10 a central axle or pivot 46 formed, for example, as a substantially cylindrical central column or post, is projected from an interior surface 48 of base portion 28 opposite from interface surface 28a and aligned substantially along axis 36 of body 22. Arm pairs 24, 26 are illustrated as each being substantially identical structures each formed as single rigid arms having respective central rotation portions 50, 52 intermediate between respective first and second arm portions 24a, 24b and 26a, 26b which are extended outwardly therefrom. For example, first and second arm portions 24a, 24b and 26a, 26b are extended radially outwardly from respective central rotation portions 50, 52 of arms 24, 26. Optionally, first and second arm portions 24a, 24b and 26a, 26b are further structured to be substantially coplanar, as shown. Central rotation portions 50, 52 of arms 24, 26 are each formed with round central apertures 54 sized to fit on cylindrical central pivot 46 on interior surface 48 of base 28 and rotate freely thereabout. Arm portions 24a, 24b and 26a, 26b are extended through circumferential slotted apertures 34 adjacent to interface surface 28a of base portion 28 which operates as a seating surface of the mounting apparatus 10 for hand-held device A. Slotted apertures 34 are sized to permit rotation of arms 24, 26 within a wide range limited only by peripheral spurs 56 that minimally interrupt circumferential slotted apertures 34 at each quadrant Peripheral spurs 56 mate with cup-shaped cover portion 30 of body 22 to stabilize base 28. Arms 24, 26 thus rotate freely about pivot 46 with portions 24a, 24b and 26a, 26b rotating in substantially concentric arcs (arrows 58) about base surface 28 between the initial relaxed or unexpanded state (shown here) and the expanded compressive state (FIG. 3).

FIG. 6 shows a biasing member 60, such as a coiled torsion spring, loosely fit over pivot 46 and stretched for hooking each of first and second end portions 62, 64 to one of arms 24, 26 in a position within peripheral boundary of base 28. Tension in coiled torsion spring 60 operates for biasing together the two pair of arms 24, 26, with respective first and second arm portions 24a, 24b and 26a, 26b being biased (arrows 38) each toward the other within limitations of circumferential slotted apertures 34, whereby opposing clamping fingers 32 are biased together the into a compressive clamping relationship with the portable device A, with arm portions 24a, 24b and 26a, 26b being rotated substantially around axis 36 of body 22.

In contrast, spreading apart the two pair of arms 24, 26 is accomplished by rotating arm portions 24a, 24b and 26a, 26b on opposite sides of interface surface 28a of a base portion 28 around axis 36 of body 22 against the torsional urging force of biasing member 60, whereby biasing member 60 is resiliently compressed between arm pairs 24, 26.

FIG. 7 illustrates insertion of portable device A into mounting apparatus 10. Body 22 of mounting apparatus 10 is mounted on mounting surface 20 external of mounting apparatus 10 with interface surface 28a of base portion 28 thereof facing substantially away from external mounting surface 20. See, e.g., FIG. 1. Here, respective opposing arm portions 24a, 24b and 26a, 26b of arm pairs 24, 26 are rotated apart (arrows 40) around central pivot or post 46 interior of body 22 into a rotated apart state, whereby substantially upright opposing fingers 32 adjacent to ends of arm portions 24a, 24b and 26a, 26b are rotated apart against the resilient torsional urging force of biasing member 60. With arm pairs 24, 26 and opposing fingers 32 being thus rotated apart (arrows 40) and restrained in the rotated apart state, portable device A is inserted (arrow 66) between rotated apart opposing fingers 32 into a seated position, for example, in a position substantially laminarly juxtaposed to upwardly facing interface surface 28a of base portion 28 of body 22.

FIG. 8 illustrates clamping of portable device A in mounting apparatus 10. With portable device A seated substantially against interface surface 28a of base portion 28, arms 24, 26 are released, whereupon torsional urging force of biasing member 60 operates for resiliently urging together (arrows 38) the rotated apart opposing arms 24, 26, whereby opposing fingers 32 are urged into compressive contact with side portions A1 and A2 of portable device A. Any hand-held portable telephone or other portable device A or similar article may thus be captured between opposing fingers 32 under the tension of torsional biasing spring 60.

The design of fingers 32 is optionally altered to space portable device A away from interface surface 28a of base portion 28 of body 22. For example, a groove or V-notch is formed in a side wall 32a of one or more of fingers 32, whereby portable device A is captured between fingers 32 in a position spaced away from interface surface 28a of base portion 28.

As shown here, side walls 32a of fingers 32 are increasingly enlarged distal from arm portions 24a, 24b and 26a, 26b. Accordingly, as illustrated, at least an upper portion 32b of fingers 32 closes over a portion of sides A1, A2 of portable device A. Side walls 32a of fingers 32 are optionally formed of a resilient elastomeric material that compresses against side portions A1, A2 of portable device A under compressive force of biasing member 60.

FIG. 9 shows operation of mounting apparatus 10 from underneath, wherein body 22 is shown with cover 30 removed for clarity. Here, similarly to FIG. 7, respective opposing arm portions 24a, 24b and 26a, 26b of arm pairs 24, 26 are rotated apart (arrows 40) around central pivot or post 46 against the resilient torsional urging force (arrows 68) of biasing member 60 into the rotated apart state, whereby substantially upright opposing fingers 32 are simultaneously rotated apart.

In FIG. 10, with arm pairs 24, 26 and opposing fingers 32 being thus rotated apart and temporarily restrained in the rotated apart state, portable device A is inserted between rotated apart opposing fingers 32 into a seated position, for example, having in a position substantially laminarly juxtaposed to upwardly facing interface surface 28a of base portion 28 of body 22. With portable device A seated substantially against interface surface 28a of base portion 28, arms 24, 26 are released, whereupon torsional urging forces (arrows 68) of biasing member 60 operate for resiliently urging together (arrows 38) the rotated apart opposing arms 24, 26, whereby opposing fingers 32 are urged into compressive contact with side portions A1 and A2 of portable device A.

Portable device A is removed from mounting apparatus 10 in a process similar to the reverse of the insertion process. Portable device A is removed by grasping device A and rotating arms 24, 26 against urging forces (arrows 68) of biasing member 60 away from device sides A1, A2 to release device A. Device A is thereafter released to be lifted between fingers 32 and away from interface surface 28a of base portion 28 of body 22.

Holding and Mounting Apparatus For A Portable Computing Device

Figure 11:
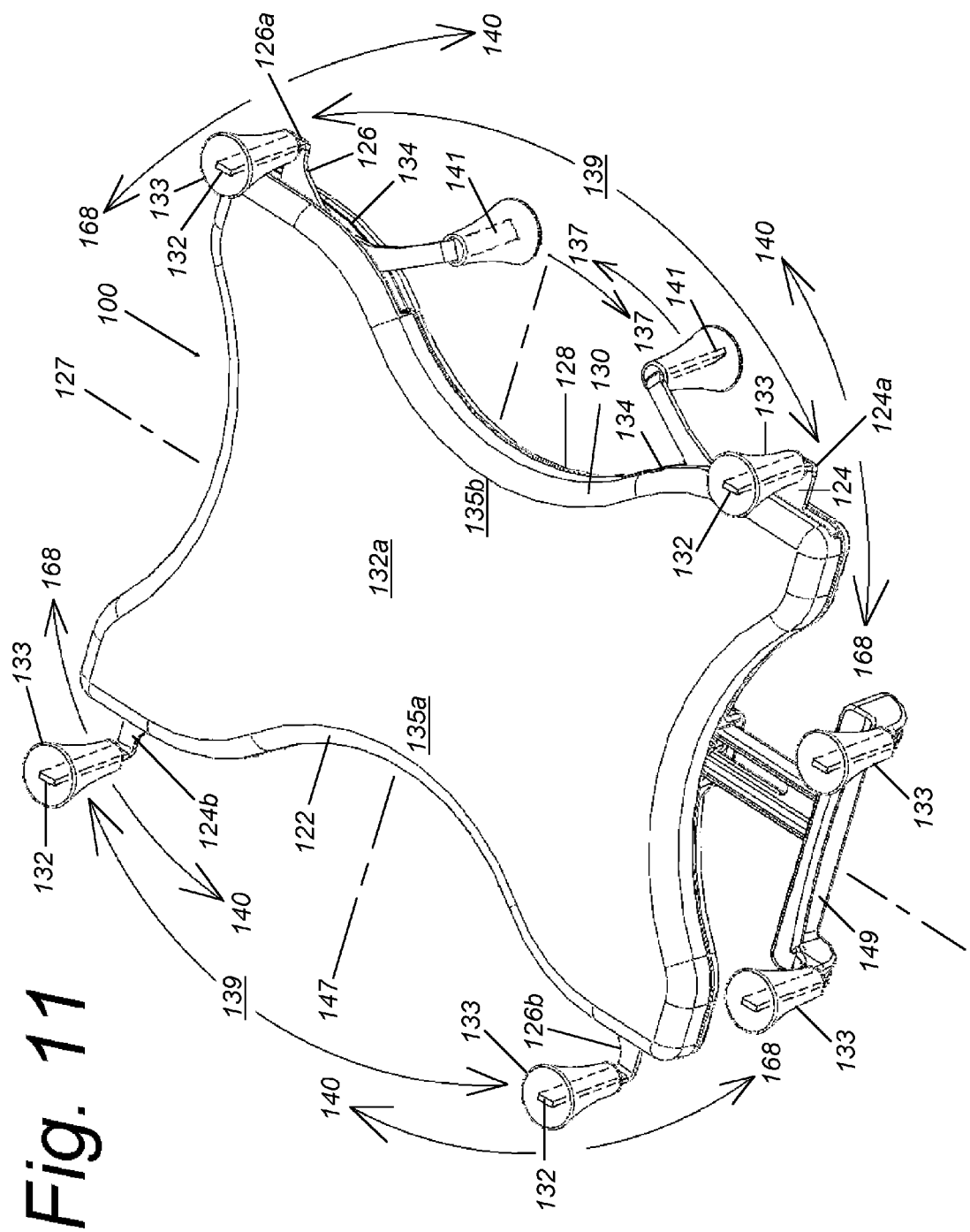
Figure 12:
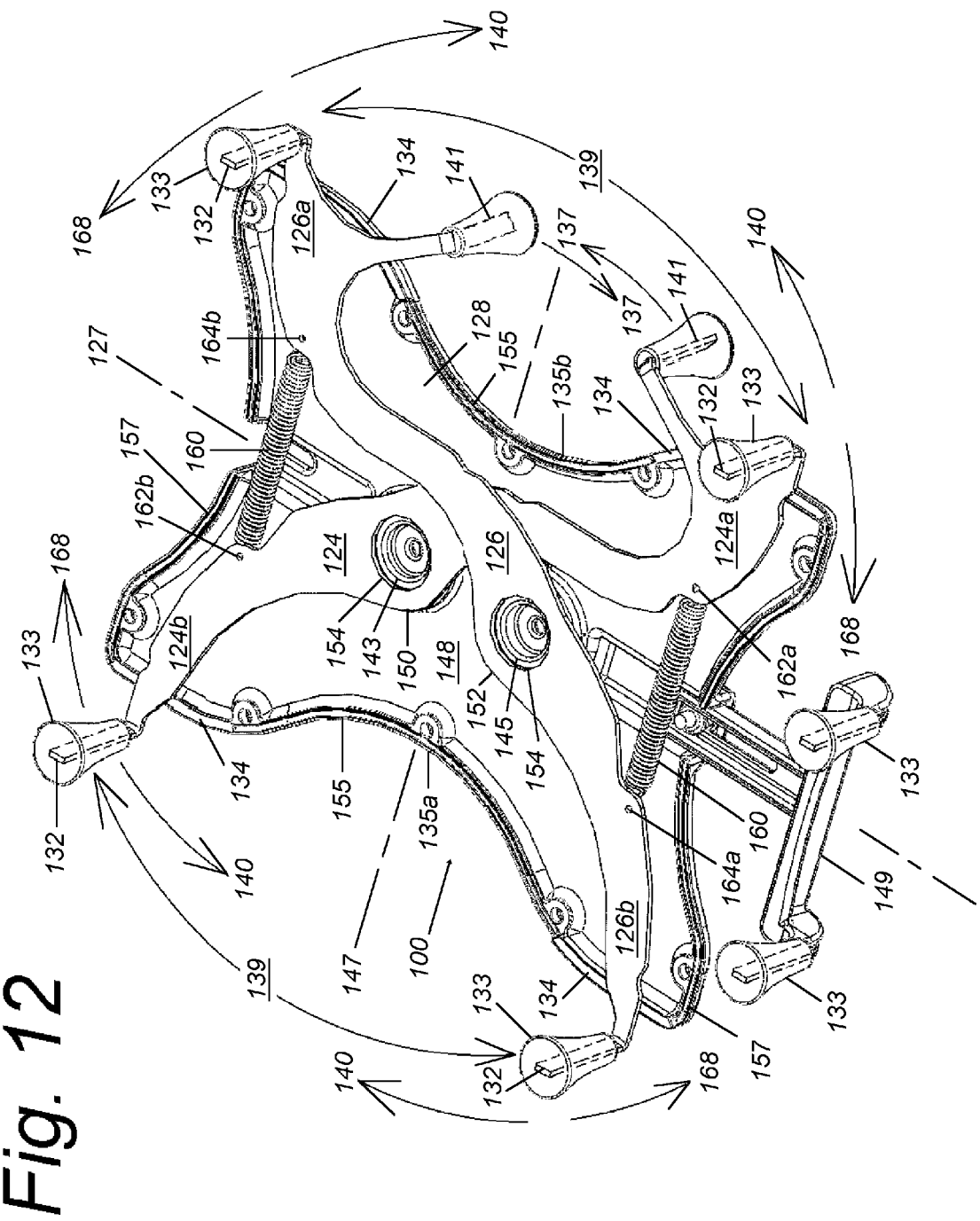

FIGS. 11 and 12 illustrate a mounting apparatus 100 that is a variation of mounting apparatus 10 shown in FIGS. 1-10.

Although the following discussion is directed toward the present invention for use in conjunction with normally hand-held portable computing device such as tablet computers, for example the type of mobile computer that is operated primarily by touch screen rather than using a physical keyboard, or convertible notebook computers of the type having an integrated keyboard, or hybrid computers of the type having a touch screen and detachable keyboard, those skilled in the art will recognize that the present invention may be utilized to securely mount a wide variety of similar articles at a convenient location. Thus, discussion of the present invention in conjunction with any portable computing device, including but not limited to a tablet computer, a mobile computer or a convertible notebook computer, is by way of example only and not by way of limitation.

As required, a detailed illustrative embodiment of the present apparatus for clamping a portable computing device is disclosed herein. However, techniques, systems and operating structures in accordance with the present apparatus for holding and clamping a portable computing device may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present apparatus for holding and clamping a portable computing device. The following presents a detailed description of an illustrative embodiment (as well as some alternative embodiments) of the present apparatus for holding and clamping a normally hand-held portable computing device.

FIG. 11 illustrates X-grip holding and mounting apparatus 100 for use in conjunction with normally hand-held portable computing devices such as but not limited to tablet computers. X-grip mounting apparatus 100 may include structure for mounting on a support stand, such as but not limited to support stand 12 as described herein.

X-grip mounting apparatus 100 is structured for releasably clamping a normally hand-held portable computing device or other normally hand-held device. For example, mounting apparatus 100 includes a substantially hollow substantially rectangular shaped body 122 having a base portion 128 substantially covered by a matingly shaped cover portion 130. Base portion 128 and cover portion 310 are joined together, for example, by several fasteners. At least a pair of rotationally movable substantially rigid opposing arms 124 and 126 extend substantially radially outwardly from body 122 adjacent to a substantially planar exterior interface surface 130a of cover portion 130 of body 122 cutting across its substantially hollow interior. Arm 124, 126 are rotationally biased toward one another on substantially opposite sides of body 122 of mounting apparatus 100. For example, arms 124, 126 cross in a substantially X-shaped pattern, for example about an axis 127 of body 122, whereby arm portions 124a, 124b and 126a, 126b of respective arm pairs 124, 126 are substantially opposed one to another. Opposing arm portions 124a, 124b and 126a, 126b of each arm 124, 126 include corresponding substantially upright clamping fingers 132 distal from mounting apparatus body 122 and projected upwardly above interface surface 130a of cover portion 130 of body 122. When arms 124, 126 cross in a substantially X-shaped pattern, distal clamping fingers 132 of respective arm portions 124a, 124b and 126a, 126b of arms 124, 126 are substantially opposed one to another. Optionally, as shown, clamping fingers 132 are covered by protective bumpers 133 formed of rubber, silicone, or another resiliently compressible elastomeric coating material suitable for protecting the computing device from scratching, while providing a high friction surface suitable for resisting any tendency for the computing device to slide from between clamping fingers 132.

A normally hand-held computing device such as a tablet computer or other normally hand-held computing device is captured between clamping fingers 132 of arms 124, 126 for convenient storage and access thereto, as described herein relative to mounting apparatus 10. X-grip mounting apparatus 100 is operated similarly to mounting apparatus 10 by forcibly rotating apart opposing arm portions 124a, 124b and 126a, 126b of arms 124, 126 (arrows 140), whereby substantially upright opposing fingers 132 are simultaneously rotated apart. Here, arm handles 141 are coupled for rotating arms 124, 126, as disclosed herein.

With arms 124, 126 and opposing fingers 132 being thus rotated apart and temporarily restrained in the rotated apart state, the portable computing device is inserted between rotated apart opposing fingers 132 into a seated position, for example, having in a position substantially laminarly juxtaposed to upwardly facing interface surface 130a of cover portion 130 of body 122. With the portable computing device thus seated substantially against interface surface 130a of cover portion 130, arms 124, 126 are released, whereupon biasing forces (arrows 168) disclosed herein resiliently urge together (arrows 168) the rotated apart opposing arms 124, 126, whereby opposing fingers 132 are urged into compressive contact with side portions of the portable computing device.

Portable computing device is removed from mounting apparatus 100 in a process similar to the reverse of the insertion process. Portable computing device is removed by grasping the computing device and, operating arm handles 141 (arrows 137) inwardly of a second axis 147 of body 122 against biasing forces (arrows 168), forcibly rotating arms 124, 126 away from the sides of the device to release the computing device. The portable computing device is thereafter released to be lifted between fingers 132 and away from interface surface 130a of cover portion 130 of body 122.

X-grip mounting apparatus 100 is optionally supported by support stand 12 which attaches mounting apparatus 100 to a desired mounting surface 20 of a vehicle, such as but not limited to an automobile, boat or airplane. For example, the universally adjustable mounting device detailed in U.S. Pat. No. 5,845,885, and other similar devices are contemplated herein. As will be recognized, such devices provide a means whereby the X-grip mounting apparatus 100 can be rapidly mounted to a wide variety of surfaces and once attached, the mounting apparatus 100 can be oriented as desired. Alternatively, no such mounting device may be utilized and mounting apparatus 100 is mounted directly to a desired surface, i.e. an automobile dashboard or console.

Rotationally movable arms 124, 126 are extended from body 122 through slotted apertures 134 adjacent to interface surface 130a for seating the portable computing device there against. Slotted apertures 134 extend part of length of body 122 and permit arms 124, 126 to rotate about opposite side portions 135a, 135b of body 122 in arcs (arrows 139) substantially parallel with interface surface 128a of base portion 128. FIG. 11 illustrates mounting apparatus 100 deployed in an initial relaxed or unexpanded state with arm pairs 124, 126 being resiliently urged together (arrows 168) in rotation each toward the other, with upright clamping fingers 132 being brought together at opposite sides of base interface surface 128a of body 122, for example opposite side portions 135a, 135b of body 122 as illustrated here.

Optionally, a stop 149 is provided adjacent to one or both of opposite side portions 135a, 135b of body 122. If present, optional stop 149 operates to position the portable computing device relative to interface surface 130a of body cover 130 prior to clamping with arm pairs 124, 126. If present, optional stop 149 is optionally positionally adjustable along axis 127 of body 122, e.g., for different portable computing devices.

FIG. 12 shows an interior of mounting apparatus 100, wherein cover 130 is removed for clarity. An interior 131 of body 122 is formed with a pair of axles or pivots 143, 145. For example, axles or pivots 143, 145 are formed as a pair of substantially cylindrical columns or posts that are projected from an interior surface 148 of base portion 128 opposite from interface surface 130a of cover 130. Pivots 143, 145 are spaced apart and substantially aligned along axis 127 of body 122. Pivots 143, 145 pivotally support arms 124, 126 relative to cover 130 of body 122.

Arms 124, 126 are illustrated as each being substantially mirror image structures each formed as single rigid curvilinear arms having respective rotation portions 150, 152 intermediate between respective first and second arm portions 124a, 124b and 126a, 126b. Optionally, first and second arm portions 124a, 124b and 126a, 126b are further structured to be substantially coplanar, as shown by example in FIGS. 5, 6 for mounting apparatus 10. Respective rotation portions 150, 152 of arms 124, 126 are each formed with substantially round apertures 154 sized to fit on cylindrical pivots 143, 145 on interior surface 148 of base 128 and rotate freely thereabout. Arm portions 124a, 124b and 126a, 126b are extended through lengthwise slotted apertures 134 adjacent to interface surface 130a of cover 130, which operates as a seating surface of the mounting apparatus 100 for receiving the portable computing device. Slotted apertures 134 are sized to permit rotation of arms 124, 126 within a wide range limited only by side spurs 155 and end spurs 157 that minimally interrupt slotted apertures 134 at each quadrant. Interrupting spurs 155, 157 mate with cover portion 130 of body 122 to cover portion 130. Arms 124, 126 thus rotate freely about interior pivots 143, 145 with portions 124a, 124b and 126a, 126b rotating in substantially minor image arcs (arrows 139) about base surface 128 between the initial relaxed or unexpanded state (FIG. 11) and the expanded compressive state (shown here).

As illustrated here, a biasing member 160, such as a conventional tension spring, is stretched for hooking to each of first and second attachment points 162a, 162b and 164a, 164b of respective arms 124, 126 each in a position between pivots 143, 145 and respective arm portions 124a, 124b and 126a, 126b. Tension in spring 160 operates for biasing together the two pair of arms 124, 126, with respective first and second arm portions 124a, 124b and 126a, 126b being biased (arrows 168) each toward the other within limitations of lengthwise slotted apertures 134, whereby opposing clamping fingers 132 are biased together the into a compressive clamping relationship with the portable computing device positioned therebetween, with arm portions 124a, 124b and 126a, 126b being rotated substantially about opposite side portions 135a, 135b of body 122. Thus, arms 124, 126 automatically adjust to secure different sizes of portable computing device.

In contrast, spreading apart the pair of arms 124, 126 is accomplished by operating arm handles 141 for rotating arm portions 124a, 124b and 126a, 126b on opposite sides of interface surface 130a of cover portion 130 about opposite side portions 135a, 135b of body 122 against the tensive urging force of biasing member 160, whereby biasing member 160 is resiliently tensioned between arm pairs 124, 126.

Note that arms 124, 126 are movable independently of each other by operation of arm handle 141 corresponding thereto.

X-grip mounting apparatus 100 is operated substantially similarly to mounting apparatus 10, as disclosed herein. The portable computing device is inserted into mounting apparatus 100 as follows.

Body 122 of mounting apparatus 100 is mounted on mounting surface 20 external of mounting apparatus 100 with interface surface 130a of cover portion 130 thereof facing substantially away from external mounting surface 20. See, e.g., FIG. 11. Outward rotation of arm handles 141, i.e., toward opposite side portions 135a, 135b of body 122, causes respective opposing arm portions 124a, 124b and 126a, 126b of arm pair 124, 126 to rotate apart (arrows 140) around pivot posts 143, 145 within interior 131 of body 122 into a rotated apart state, whereby substantially upright opposing fingers 132 adjacent to ends of arm portions 124a, 124b and 126a, 126b are rotated apart against the resilient tensive urging force of biasing member 160. With arm pair 124, 126 and opposing fingers 132 thereof being thus rotated apart (arrows 140) and restrained in the rotated apart state, the portable computing device is inserted between rotated apart opposing fingers 132 into a seated position, for example, in a position substantially laminarly juxtaposed to upwardly facing interface surface 130a of cover 130 of body 122. Clamping of the portable computing device in mounting apparatus 100 is as follows.

With the portable computing device seated substantially against interface surface 130a of cover portion 130, outwardly rotated arm handles 141 are released, whereby arms 124, 126 are released. Thereafter, the tensive urging force of biasing member 160 operates for resiliently urging together (arrows 168) the rotated apart opposing arms 124, 126, whereby opposing fingers 132 are urged into compressive contact with side portions of the portable computing device. Any tablet computer, mobile computer, convertible notebook computer or other portable computing device or similar article may thus be captured between opposing fingers 132 under the tension of tensive biasing spring 160.

As disclosed herein for fingers 32, here also the design of protective bumpers 133 on fingers 132 is optionally altered to space the portable computing device away from interface surface 130a of cover portion 130 of body 122. For example, a groove or V-notch is formed in a side wall 132a of one or more of protective bumpers 133 on fingers 132, whereby the portable computing device is captured between protective bumpers 133 on fingers 132 in a position spaced away from interface surface 130a of cover portion 130.

As shown here, similarly to clamping finger 32, side walls 132a of protective bumpers 133 on fingers 132 are increasingly enlarged distally from arm portions 124a, 124b and 126a, 126b. Accordingly, as illustrated herein, at least an upper portion 132b of protective bumpers 133 closes over a portion of the sides of the portable computing device. Side walls 132a of protective bumpers 133 are optionally formed of a resilient elastomeric material that compresses against the sides of the portable computing device under compressive force of biasing member 160.

The portable computing device is removed from mounting apparatus 100 in a process similar to the reverse of the insertion process. The portable computing device is removed by grasping the computing device and rotating arm handles 141 outwardly. Arms 124, 126 are responsively rotated outwardly against urging forces (arrows 168) of biasing member 160 away from the sides of the portable computing device to release the device. The portable computing device is thereafter released to be lifted between fingers 132 and away from interface surface 130a of cover portion 130 of body 122.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:
1. A mounting apparatus for a portable device, the mounting apparatus comprising:
 a body comprising a base portion substantially covered by a cover portion with a plurality of peripheral slots formed therebetween, and two pivots in spaced apart positions between the base and cover portions;
 two substantially rigid crossed arms that are spreadable about the body, each of the arms pivotably mounted on different ones of the two pivots and extended outwardly through the slots, and further comprising a clamping finger adjacent to opposite ends thereof and positioned externally of the body and projected above the cover portion thereof;

a handle positioned externally of the body and coupled for rotating at least one of the arms; and a biasing member coupled for biasing together opposing pairs of the clamping fingers.

2. The apparatus of claim 1, wherein the arms are further crossed in a substantially X-shaped configuration.

3. The apparatus of claim 1, wherein the biasing member is further coupled between the two arms.

4. The apparatus of claim 3, wherein the biasing member is further coupled to each of the arms between the one of the pivots and one of the clamping fingers thereof.

5. The apparatus of claim 3, further comprising two biasing members; and wherein a first biasing member is further coupled between the pivot and a first one of the clamping fingers on each arm, and a second biasing member is further coupled between the pivot and a second one of the clamping fingers on each arm.

6. The apparatus of claim 1, wherein the biasing member further comprises a tension spring.

7. The apparatus of claim 6, wherein at least one of the arms further comprises the handle.

8. A mounting apparatus for a portable device, the mounting apparatus comprising:

a body comprising a base portion substantially covered by a cover portion having an exterior interface surface, the base and cover portions substantially enclosing an interior space therebetween with a plurality of peripheral slotted apertures formed therebetween, and further comprising two pivots in spaced apart positions between the base and cover portions;

a pair of substantially rigid arms mounted on the two pivots in a substantially X-shaped pattern and extended outwardly of the interior space of the body through the peripheral slotted apertures thereof, and further being spreadable about the interface surface of the body cover portion, each of the arms further comprising:

a rotation portion pivotally coupled to one of the pivots, a pair of substantially upright clamping fingers adjacent to opposite distal end portions thereof and positioned externally of the interior space of the body and projected upwardly above the exterior interface surface of the cover portion thereof, and a handle projected therefrom; and a biasing member coupled between attachment points of the arms for biasing together opposing pairs of the clamping fingers.

9. The apparatus of claim 8, wherein each of the arms is independently spreadable.

10. The apparatus of claim 8, wherein biasing member further comprises a tension spring.

11. The apparatus of claim 10, wherein the attachment points for the biasing member are further positioned between the one of the pivots and one of the clamping fingers on each arm.

12. The apparatus of claim 11, wherein the handles are further positioned between the attachment points for the biasing member and one of the clamping fingers on each arm.

13. The apparatus of claim 8, further comprising two biasing members; and wherein a first one of the biasing members is further coupled between a first one of the pivots and a first one of the clamping fingers on each arm, and a second one of the biasing members is further coupled between a second one of the pivots and a second one of the clamping fingers on each arm.

14. The apparatus of claim 13, wherein the base portion of the body is further configured for mounting to a support stand.

15. The apparatus of claim 8, wherein one or more of the clamping fingers further comprises a protective bumper.

16. A mounting apparatus for a portable device, the mounting apparatus comprising:

a body structured for mounting to a support stand, the body comprising a base portion substantially covered by a cover portion having a substantially planar exterior interface surface, the base and cover portions substantially enclosing an interior space therebetween with a plurality of peripheral slotted apertures formed therebetween, and further comprising two pivots in spaced apart positions between the base and cover portions and aligned substantially along one axis of the body;

a pair of substantially rigid curvilinear arms mounted on the two pivots and crossing in a substantially X-shaped pattern, the arms being extended outwardly of the interior space of the body through the peripheral slotted apertures thereof and being independently spreadable about the interface surface of the body cover portion, each of the arms further comprising:

an intermediate rotation portion pivotally coupled to one of the pivots, a pair of substantially upright clamping fingers adjacent to opposite distal end portions thereof and positioned externally of the interior space of the body and projected upwardly above the exterior interface surface of the cover portion thereof, and a handle projected therefrom below the exterior interface surface of the cover portion of the body; and a resilient biasing member coupled between attachment points of the arms for resiliently biasing together opposing pairs of the clamping fingers.

17. The apparatus of claim 16, wherein the attachment points for the biasing member are further positioned between the one of the pivots and one of the clamping fingers on each arm.

18. The apparatus of claim 17, wherein the handles are further positioned between the attachment points for the biasing member and one of the clamping fingers on each arm.

19. The apparatus of claim 17, further comprising two biasing members; and wherein a first one of the biasing members is further coupled between a first one of the pivots and a first one of the clamping fingers on each arm, and a second one of the biasing members is further coupled between a second one of the pivots and a second one of the clamping fingers on each arm.

* * * * *